United States Patent [19]

Nobile

[11] Patent Number: 4,790,555
[45] Date of Patent: Dec. 13, 1988

[54] BICYCLE FAIRING AND MOUNTING MEANS THEREFOR

[76] Inventor: John Nobile, Fairfield Engineering, 71 Wildwood Rd., Fairfield, Conn. 06430

[21] Appl. No.: 101,982

[22] Filed: Sep. 29, 1987

[51] Int. Cl.$^4$ .............................................. B62J 17/04
[52] U.S. Cl. .................. 280/289 S; 296/78.1; D12/182
[58] Field of Search ........... 280/289 G, 289 S, 289 R, 280/289 A, 289 H; 296/84 R, 78.1, 84 C; 180/219; D12/182

[56] References Cited

U.S. PATENT DOCUMENTS

| | | | |
|---|---|---|---|
| D. 106,422 | 10/1937 | Bowers | D12/182 |
| D. 245,329 | 8/1977 | Wiegert | D12/182 |
| D. 246,452 | 11/1977 | Harris | D12/182 |
| D. 248,940 | 8/1978 | Saunders, IV | D12/182 |
| 3,690,721 | 9/1972 | Herbert | 296/78.1 |
| 3,891,265 | 6/1976 | Blackburn | 296/78.1 |
| 4,010,976 | 3/1977 | Shields | 296/78.1 |
| 4,022,487 | 5/1977 | Leahy | 280/289 |
| 4,066,290 | 1/1978 | Wiegert et al. | 296/78.1 |
| 4,166,650 | 9/1979 | Saunders, IV | 296/78.1 |
| 4,168,098 | 8/1979 | Willey | 296/78.1 |
| 4,479,663 | 9/1984 | Morris et al. | 280/289 |

FOREIGN PATENT DOCUMENTS

| | | | |
|---|---|---|---|
| 867497 | 11/1941 | France | 10/5 |
| 331745 | 11/1935 | Italy . | |

Primary Examiner—David M. Mitchell
Assistant Examiner—Richard Camby
Attorney, Agent, or Firm—Parmelee, Bollinger & Bramblett

[57] ABSTRACT

A bicycle fairing comprises a blunt molded body shield having a upstanding, rearwardly sloping, flexible, transparent windshield attached thereto. The body shield has a blunt end extending outwardly therefrom having an axis passing therethrough forming an angle with the rearwardly sloping windshield from a side elevation which is more than twice the angle of a rearwardly sloping lower surface of the shield. The body portion of the fairing above the axis in side elevation is approximately twice the length of the fairing extending below the axis. Accordingly, the windshield is high enough to shield the rider while the fairing extends downwardly enough to prevent airflow from coming up from the bottom onto the rider. The fairing is mounted at four fixed points at its extremeties for maximum rigidity and is easily adjustable and removable or can be permanently installed. The mounting points comprise a pair of angular mounting elements fixed to opposite sides of the body shield below the windshield, each of which have curved arms extending therefrom which are detachably mounted to opposite sides of the handlebars. A U-shaped opening in the lower surface of the body shield carries a U-shaped clip mounted therearound with the ends thereof mounted on opposite sides of the bicycle wheel fork. A hook is mounted on the stem holding the handlebars for engaging a hole in the windshield to hold the windshield in a folded position to permit the rider to stand and lean forward on the bicycle, e.g. in climbing steep hills.

5 Claims, 4 Drawing Sheets

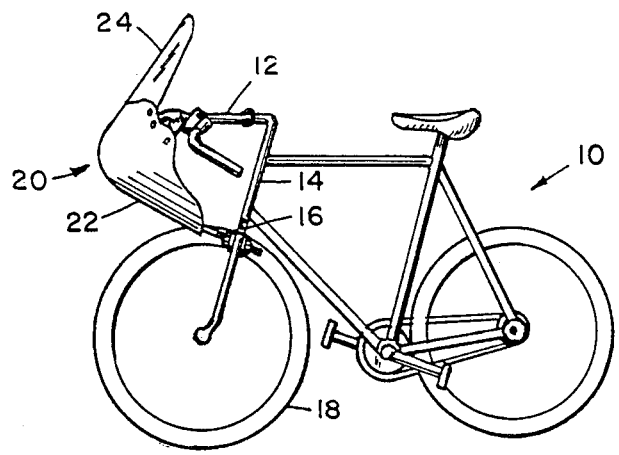
FIG. 1
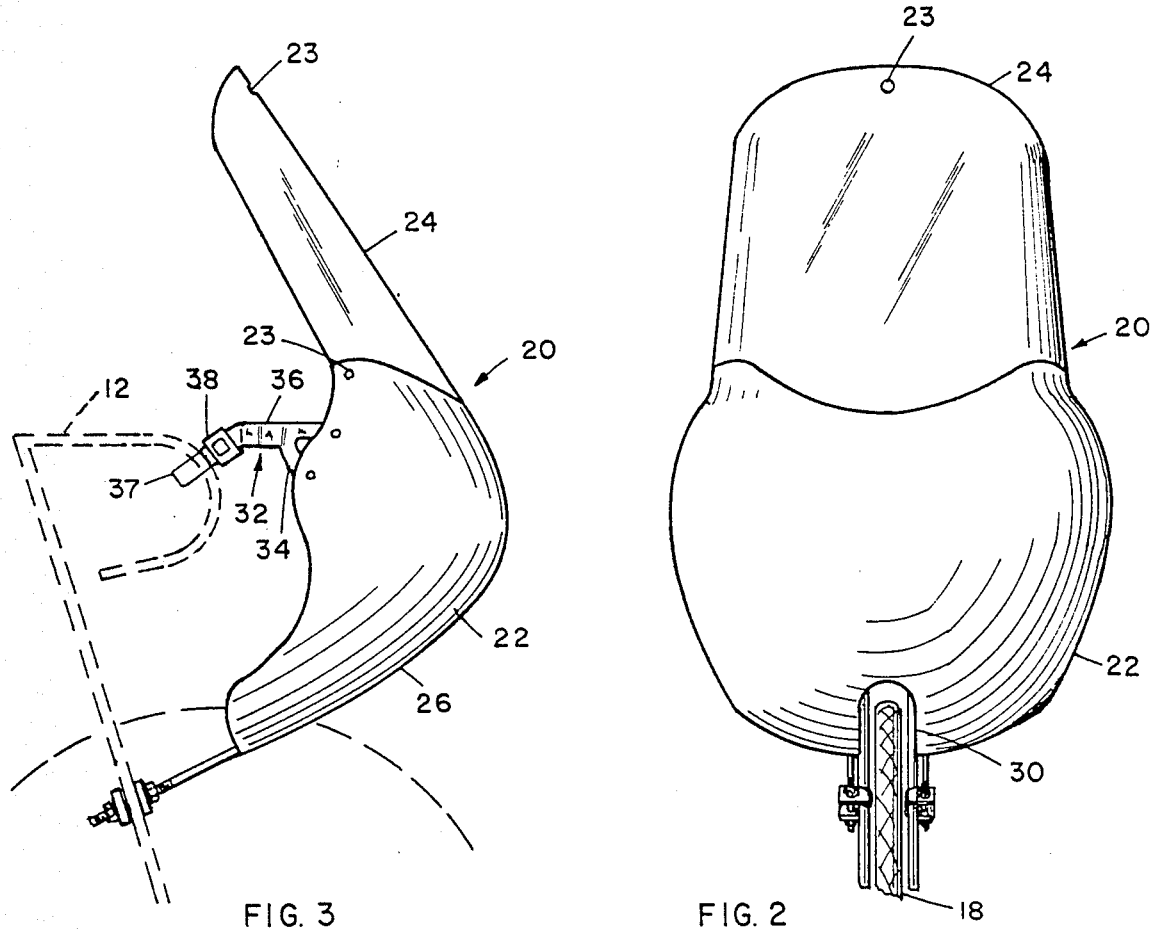
FIG. 3
FIG. 2

BICYCLE FAIRING AND MOUNTING MEANS THEREFOR

BACKGROUND OF THE INVENTION

This invention relates to a bicycle fairing, and more particularly to such a fairing and its mounting structure for mounting the fairing at four points at its extremeties for maximum rigidity, yet permitting folding and holding the windshield in a folded position.

High performance racing bicycles are built for speed and have become increasingly popular even though few of those owners race or compete in sanctioned racing events. The increased bicycle popularity is for fitness and recreational activity involving either individuals or very large groups covering increasing distances as well as for touring purposes. In order to increase speed and reduce fatigue, it is well known that wind resistance or drag associated with the movement of any vehicle may be reduced by the addition of a fairing. The problem of course, is to provide a fairing which is suitable for use on different types of bicycles which will effectively cover the driver and extend downward far enough to prevent airflow from coming up from the bottom onto the rider. The mountings must also be flexible and rigid enough to accommodate easy adjustability and removability as well as being capable of being permanently installed. In addition, it would be desirable to be able to fold the windshield out of the way without removing the fairing during certain operating maneuvers.

SUMMARY OF THE INVENTION

Accordingly, it is an object of this invention to provide a new and improved bicycle fairing having a configuration which effectively shields the rider and reduces wind drag.

Still another object of this invention is to provide a new and improved fairing which extends downward far enough to prevent airflow from coming up from the bottom onto the rider and thus improves airflow both above and below the rider.

Still another object of this invention is to provide a new and improved fairing which is mounted for maximum rigidity yet is easily adjustable and removable or can permanently be installed on a variety of different bicycle frames.

Still another object of this invention is to provide a fairing having a configuration which minimizes the adverse effects of side winds by creating a lifting force which acts to counteract any side drag thereby preventing the wind from steering the bicycle on which the fairing is mounted.

A further object of this invention is to provide a fairing with a flexible windshield whose operating position can be varied without removing the fairing from the bicycle.

In carrying out this invention in one illustrative embodiment thereof, a bicycle fairing for a bicycle having a frame, a handlebar, front wheel fork and a fork holder coupling the handlebar to the front wheel fork is provided with a blunt, unitary molded body shield having rearwardly sloping sides with an upright rearwardly sloping transparent windshield mounted thereto with the windshield being narrower and longer in the side elevation profile than the body shield. The most forward portion of the blunt end having an axis passing therethrough forming an angle with the rearwardly sloping windshield from a side elevation which is more than twice the angle of a rearwardly sloping lower surface of the windshield with that axis. The fairing above the axis in side elevation is approximately twice the length of the portion of the fairing extending below the axis. Mounting means are provided which are attached to diametrically opposed outer extremeties of the body shield for detachably coupling the fairing to opposite sides of the handlebars. A mounting means is mounted on a rearwardly sloping slotted lower surface of the body shield for adjustably attaching the coupling of the fairings to opposite sides of the front wheel fork with the body shield extending below the top of the front wheel of the bicycle. Accordingly, the shield is detachably and adjustably coupled to four points on the bicycle for maximum rigidity yet being easily adjustable and/or removably installed on the bicycle. The flexible windshield may also be folded and hooked near the top near the stem of the handlebars to permit operating maneuverability by the rider.

BRIEF DESCRIPTION OF THE DRAWINGS

The invention together with further objects, features, advantages and aspects thereof may be more clearly understood from the following description taken in connection with the accompanying drawings.

FIG. 1 is a side elevational view of a diagrammatic illustration of a conventional bicycle illustrating the fairing and mounting means therefor installed thereon.

FIG. 2 is a front view of the fairing installed on the bicycle wheel of FIG. 1.

FIG. 3 is an enlarged side elevational view of the fairing of FIG. 1 illustrating the bicycle on which it is mounted in phantom.

DESCRIPTION OF THE PREFERRED EMBODIMENTS

Figure 4:
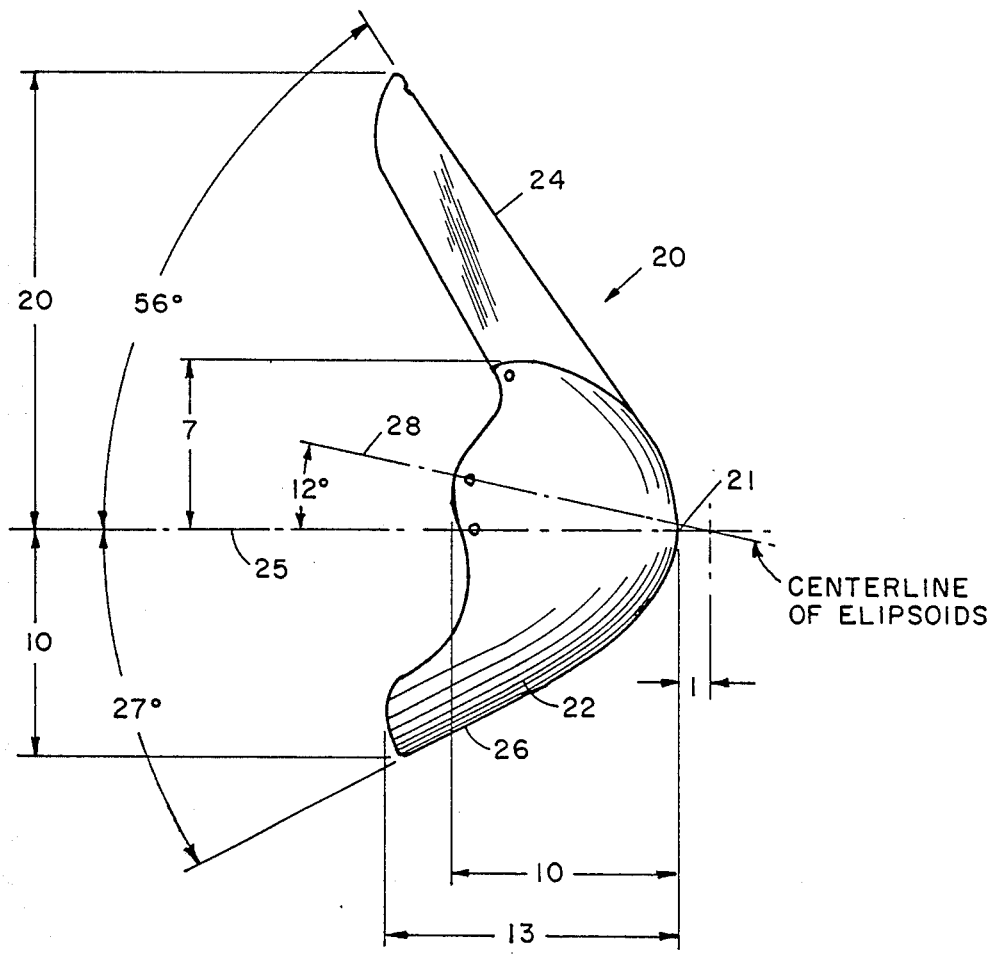
FIG. 4 is a side elevational view of the fairing in accordance with the present invention illustrating various relative dimensions and angles which define the relative shape and configuration of the fairing in accordance with the present invention.

Referring now to FIG. 1, a streamlined fairing 20 for a bicycle 10 which is conventional having handlebars 12, a fork coupler 14 and a front wheel fork 16 on which a front wheel 18 of the bicycle is conventionally mounted.

In accordance with the present invention, a fairing 10 having a blunt, molded, unitary body shield 22 and an upright windshield 24 secured thereto by screws 23, or any other suitable means, is mounted on the bicycle 10 at four points as will be described herein. The general frontal configuration of the fairing is illustrated in FIG. 2, the purpose of which is to streamline the shape of the bicycle 10 and its rider for travelling through the air. Since the aerodynamic drag consumes up to half of the rider's power at only 10 miles an hour and an overwhelming 80% at 20 miles an hour, drag reduction is achieved using the fairing in the manner described hereinafter. The windshield 24 has an opening 23 located centrally and near the top for holding the windshield in a folded position to be described hereinafter.

FIG. 4 illustrates the general configuration and proportioning of the fairing 20 in accordance with the present invention. Since the purpose of the fairing is to streamline the shape of the rider and the bicycle, the height of the fairing must completely shield the head of the crouching rider and at the same time prevent air from coming up from the bottom of the bicycle against the rider. As will be seen in FIG. 4, the body shield 22 has a blunt end 21 having an axis 25 therethrough passing through the furthermost point on the blunt end 21. The fairing 22 has rearwardly sloping sides in every direction with the lower surface 26 of the body shield 22 forming an angle of 27° with axis 25 while the windshield 24 is mounted on the body shield 22 forming an angle of 56° with the axis 25. Accordingly, the angle formed on the upper surface of the fairing including windshield 24 represented by the area above the axis 25 is at an angle over twice the size of the angle formed by the lower surface with the axis 25. At the same time, in side elevational profile as shown in FIG. 4, the height of the fairing above the axis 25 is twice the height of the fairing extending below the axis 25. The purpose of course, is to fully shield the crouching rider on the seat of the bicycle 10. In addition, the shield is wide enough from a frontal view to cover the handlebars and most of the rest of the bicycle frame.

The general configuration of the frontal surface of the fairing 20 is formed by a series of elipsoids extending about a center line 28 making an angle of 12° with the axis 25 and extending outwardly in front of the blunt end 21 as shown in FIG. 4. The elipsoid configuration provides the bulbous, blunt, front end configuration to the fairing 20 which is desired. As will be seen in FIG. 2, the shield 22 has a U-shaped slot 30 therein which is adapted to receive the upper portion of the front wheel 18 of the bicycle 10 when the fairing 20 is mounted on the bicycle. The purpose of course is to prevent the air striking the fairing in the front from coming up and hitting the rider. The rounded, streamlined, rearwardly sloping lower surface 26 directs the air downwardly toward the pedals and the rider's feet rather than upwardly against the mass of the rider's body.

Figure 5:
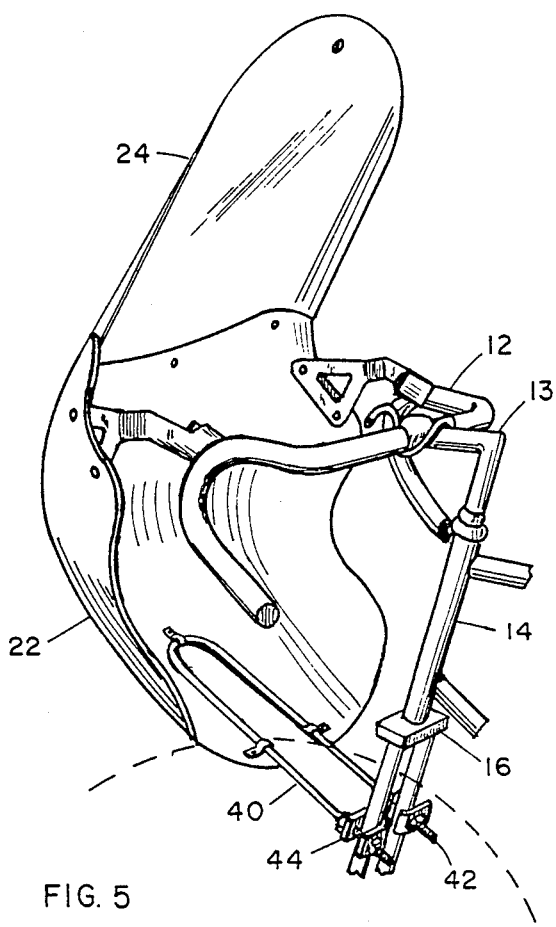
FIG. 5 is a rear perspective view of the fairing and its mounting means shown mounted on the bicycle.
Figure 7:
FIG. 7 is a side elevational view of an angled arm which is used to mount the U-shaped clip shown in FIG. 4 to opposite sides of the bicycle fork.
Figure 8:
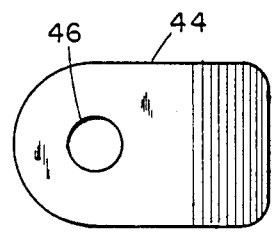
FIG. 8 is a top view of the angled arm of FIG. 2.
Figure 6:
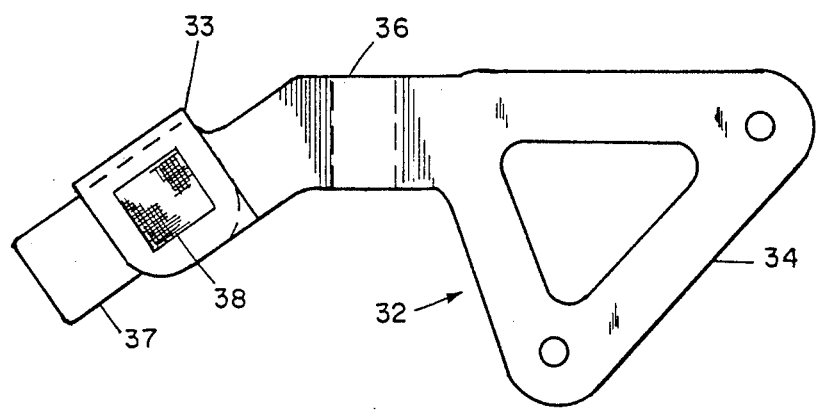
FIG. 6 is a side elevational view of the mounting brackets used to mount the fairing to the handlebars.

In accordance with an important aspect of the present invention, as will best be seen in FIG. 5, the fairing 20 is mounted to the bicycle frame at four points to provide flexibility in mounting as well as rigidity once the fairing is attached to the bicycle. FIG. 6 illustrates a mounting bracket 32 having a triangular base 34 with an angled arm 36 extending therefrom holding a U-shaped foot 33 adapted to fit over the handlebar 12. The foot 33 contains a Velco strap 37 and a Velcro pad 38 which are adapted to releasably strap the bracket 32 to the handlebar 12 as shown in FIGS. 1, 2 and 5. The triangular base 34 of the bracket 32 is mounted by screws or other suitable means to opposite extremeties of the shield 22 just below the windshield 24 as shown in FIG. 5. Accordingly, the mounting brackets 32 are adapted to adjustably and detachably mount two opposite sides of the fairing 20 to the handlebars 12.

As will be seen in FIG. 5, a U-shaped clip 40 is mounted around the inside perimeter of the U-shaped slot 30 in the bottom surface 26 of the body shield 22. Threaded ends 42 extend on opposite sides of the front wheel fork 16 and are adapted to be adjustably and detachably mounted thereon with angled arms 44 having an opening 46 therein and an angled end 48 which when used in a pair and oppositely facing form a clamp on the ends 42 of the U-shaped clip 40 to adjustably and releasably secure the lower surface 26 of the body shield 22 to opposite sides of the front wheel fork 16.

What has thus been provided are four easily adjustable but rigid stable points to which the fairing 20 has been anchored on the bicycle 10. This rigid structure is easy to mount and dismount and does not transmit undue stress to the fairing 20 by various wind pressures because the mountings are rigid and balanced. In addition, the shape of the fairing 20 and its mounting prevents air from coming up from the bottom while providing a slight upward force thereon which counterbalances any adverse effects of side winds to counteract side drag. Accordingly, this particular shaped fairing with its blunt configuration and sloping rearward walls prevents the wind from steering the bicycle. The fairing also has a cylindrical windshield which keeps the upper body out of the airflow. Accordingly, the poor shape of a rider on a bicycle is effectively shielded from encountering the air which is deflected by the fairing 20.

The fairing may have the body shield constructed of reinforced plastic such as glass reinforced polyester, and the windshield 24 may be of a clear flexible plastic such as polycarbonate. Although the areas are not critical in the configuration illustrated in FIG. 4, the side area in a side elevational profile is 164 square inches while the frontal area as shown in FIG. 2 is 454 square inches. It is important that the side area be substantially less (2-3 times) than the frontal area. Such dimensions will be suitable for streamlining a conventional racing bicycle.

Figure 9:
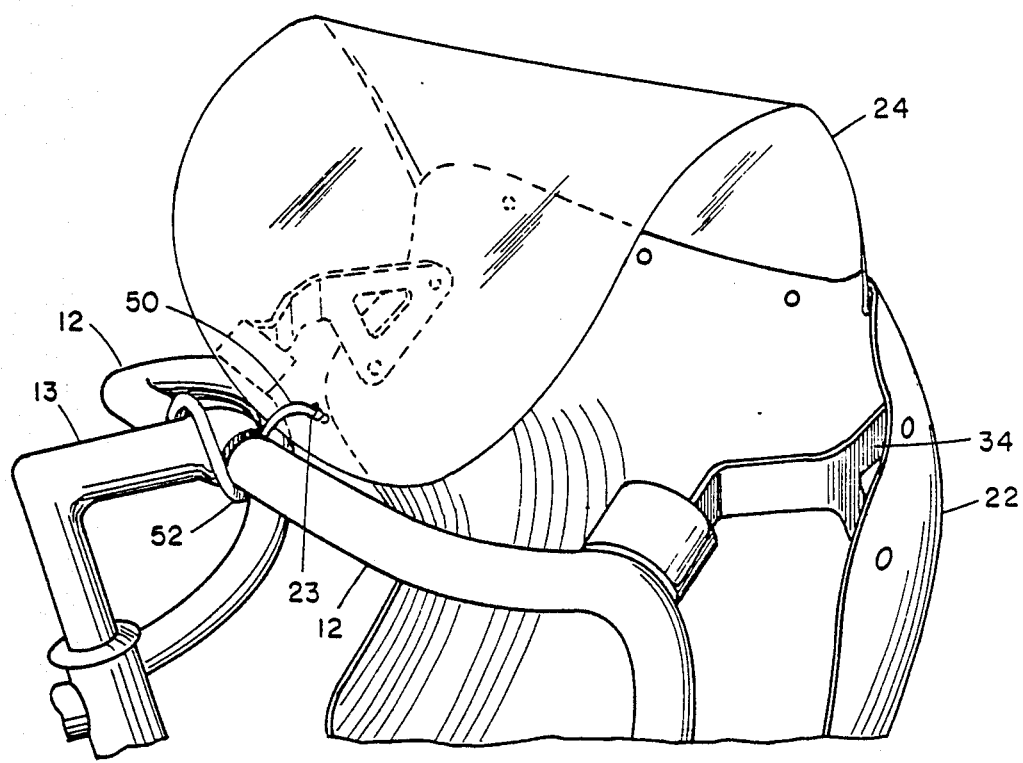
FIG. 9 is a rear perspective view of the fairing installed on the flexible windshield and hooked in a folded position.

As will be seen in FIG. 9 a hook 50 is anchored by a wrap-around holder 52 mounted on the stem 13 in which the handlebars 12 are mounted. The hook 50 is adapted to fit into and engage the hole 23 in the top of the windshield 24 for holding the windshield in a folded position as shown on FIG. 9. The windshield 24 has rigidity due to its cylindrical shape, but once the windhsield is folded, it can be easily hooked and held in place as shown in FIG. 9 and at the same time is readily releasable by merely removing the hook 50 from the hole 23.

This desirable feature would enhance the usefulness of the fairing 20 by permitting the rider to remove the windshield from interfering with power movements by the rider in standing and leaning forward on the bicycle. The rider would use this feature while climbing steep hills. Thus, the rider would simply bend and hook the folded windshield to get it out of the way before climbing a steep hill. The foldable, releasable feature allows the windshield position to be varied without requiring the removal of the fairing. When the lowered windshield is no longer required, the hook is released and the windshield returns to its initial relatively rigid upright position.

In accordance with the present invention, the windshield is high enough to shield the rider in a normal riding position and the fairing extends downward far enough to prevent airflow from coming up around the bottom and onto the rider. The body shield is rigid enough to support the clear windshield under shock loads and the shape is blunt to minimize adverse effects of sidewinds by creating a lifting movement which acts to counteract any sidedrag. In addition, the fairing is mounted at four points at its extremeties for maximum rigidity, ease of adjustment and removability or can be permanently installed on these four points. The windshield is also foldable to get it out of the way on certain riding maneuvers such as power movements requiring the rider to stand and lean forward while pedalling. By hooking the windshield in the folded position, the windshield is folded out of the way of the rider and is unhooked and restored in the initial position when the power maneuver is completed.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A bicycle fairing for a bicycle having a frame, a handlebar, front wheel fork holder coupling said handlebar to said front wheel fork comprising:
    a blunt molded body shield having an upstanding rearwardly sloping transparent windshield attached thereto,
    said body shield having a blunt end with a surface formed of rearwardly sloping increasing elipsoids, the blunt end of which has an axis passing therethrough forming an angle with the rearwardly sloping windshield from a side elevation which is more than twice the angle of the rearwardly sloping lower surface of the rearwardly sloping increasing elipsoids formed with said axis,
    the portion of said fairing above said axis in side elevation being approximately twice the length of the portion of the fairing extending below said axis,
    mounting means attached to diametrically opposed outer extremeties of said body shield for detachably coupling said fairing to opposite sides of said handlebars,
    a means mounted on the rearwardly sloping lower surface of said body shield for adjustably detachably coupling said fairing to opposite sides of said front wheel fork with said body shield extending below the top of the front wheel of a bicycle whereby said shield is detachably and adjustably coupled to four points on said bicycle for maximum rigidity yet being easily adjustable and removably installed on said bicycle,
    said rearwardly sloping lower surface of said shield has a U-shaped slot therein for position said front bicycle wheel therein when said shield is mounted on said bicycle and a U-shaped clip mounted on said shield bordering said slot, said clip having opposite ends thereon mounted on said front wheel fork.

2. A bicycle fairing for a bicycle having a frame, a handlebar, front wheel fork and a fork holder coupling said handlebar to said front wheel fork comprising:
    a blunt molded body shield having rearwardly sloping sides and an upright rearwardly sloping transparent windshield mounted thereto said windshield being narrower and longer in a side elevation profile than said body shield,
    a pair of angular mounting elements fixedly mounted to opposite sides of said body shield below said windshield, each of said mounting elements having a curved arm extending therefrom for detachably mounted said fairing to opposite sides of said handlebars,
    a U-shaped opening in the lower sloping surface of said body shield adapted to position said body shield over and partially around a bicycle wheel,
    a U-shaped clip mounted around said U-shaped opening in said body shield, and
    adjustable means for mounting the ends of said U-shaped clip on said front wheel fork whereby said fairing is detachably and adjustably mounted to four spaced and balanced points on the bicycle thereby providing mounting flexibility and rigidity.

3. The bicycle fairing as claimed in claim 2 having a pair of angled arms mounted on each end of said U-shaped clip forming an adjustable clamp on said front wheel fork when mounted on the ends of said U-shaped clip.

4. A bicycle fairing for a bicycle having a frame, a handlebar, front wheel fork and a fork holder coupling said handlebar to said front wheel fork comprising:
    a blunt molded body shield having an upstanding rearwardly transparent windshield attached thereto,
    said body shield having a blunt end with a surface formed of rearwardly sloping increasing elipsoids, the blunt end of which has an axis passing therethrough forming an angle with the rearwardly sloping windshield from a side elevation which is more than twice the angle of the rearwardly sloping lower surface of the rearwardly sloping increasing elipsoids formed with said axis,
    the portion of said fairing above said axis in side elevation being approximately twice the length of the portion of the fairing extending below side axis,
    mounting means attached to diametrically opposed outer extremeties of said body shield for detachably coupling said fairing to opposite sides of said handlebar,
    a means mounted on the rearwardly sloping lower surface of said body shield for adjustably detachably coupling said fairing to opposite sides of said front wheel fork with said body shield extending below the top of the front wheel of a bicycle whereby said shield is detachably and adjustably coupled to four points on said bicycle for maximum rigidity yet being easily adjustable and removably installed on said bicycle,
    said windshield is flexible having a cylindrical shape with a central opening in the top thereof, a hook mounted centrally on said handlebar adapted to engage said central opening in said windshield in a folded position in front of said handlebar until released.

5. A bicycle fairing for a bicycle having a frame, a handlebar, front wheel fork and a fork holder coupling said handlebar to said front wheel fork comprising:
    a blunt molded body shield having an upstanding, rearwardly sloping, transparent, flexible, cylindrical windshield attached thereto,
    said body shield having a blunt end with a surface formed of rearwardly sloping increasing elipsoids, the blunt end of which has an axis passing therethrough forming an angle with the rearwardly sloping windshield from a side elevation which is more than twice the angle of the rearwardly sloping lower surface of the rearwardly sloping increasing elipsoids formed with said axis, the portion of said fairing above said axis in side elevation being approximately twice the length of the portion of the fairing extending below said axis,
a hook mounted centrally on said handlebars facing the rear of said fairing,
a central opening in upper portion of said flexible cylindrical windshield,
said hook being adapted to engage said central opening for holding said windshield in a folded position in the front of said handlebar and being readily releasable by rider of the bicycle for restoring the windshield to its original upstanding rearwardly sloping position on said fairing.

* * * * *